United States Patent
Komatsu et al.

(10) Patent No.: US 9,644,703 B2
(45) Date of Patent: May 9, 2017

(54) SHOCK ABSORBER

(71) Applicant: KAYABA INDUSTRY CO., LTD., Tokyo (JP)

(72) Inventors: Seiichiro Komatsu, Aichi (JP); Tetsuo Arahata, Gifu (JP); Yuusuke Furuta, Gifu (JP); Hirohito Kato, Gifu (JP)

(73) Assignee: KYB Corporation, Tokyo (JP)

( * ) Notice: Subject to any disclaimer, the term of this patent is extended or adjusted under 35 U.S.C. 154(b) by 70 days.

(21) Appl. No.: 14/759,943

(22) PCT Filed: Jan. 21, 2014

(86) PCT No.: PCT/JP2014/051048
§ 371 (c)(1),
(2) Date: Jul. 9, 2015

(87) PCT Pub. No.: WO2014/115698
PCT Pub. Date: Jul. 31, 2014

(65) Prior Publication Data
US 2015/0354660 A1    Dec. 10, 2015

(30) Foreign Application Priority Data

Jan. 25, 2013   (JP) ................................. 2013-012516

(51) Int. Cl.
*F16F 9/32*      (2006.01)
*F16F 9/18*      (2006.01)
(Continued)

(52) U.S. Cl.
CPC .............. *F16F 9/5126* (2013.01); *F16F 9/18* (2013.01); *F16F 9/504* (2013.01)

(58) Field of Classification Search
CPC ...... F16F 9/061; F16F 9/18; F16F 9/19; F16F 9/3214; F16F 9/504; F16F 9/512; F16F 9/5126

See application file for complete search history.

(56) References Cited

U.S. PATENT DOCUMENTS 3,208,760 A * 9/1965 Lucien ................... B60G 15/12
                                                              267/64.19
2011/0214953 A1  9/2011 Maeda et al.

FOREIGN PATENT DOCUMENTS

EP    EP 2128484 A1 * 12/2009 ............ F16F 9/5126
JP    2008-215459 A    9/2008
(Continued)

*Primary Examiner* — Anna Momper
(74) *Attorney, Agent, or Firm* — Rabin & Berdo, P.C.

(57) ABSTRACT

A shock absorber includes a damping passage that connects an expanding-side chamber with a contracting-side chamber inside a cylinder, a housing that forms a pressurizing chamber, a free piston that partitions the pressurizing chamber into an expanding-side pressurizing chamber and a contracting-side pressurizing chamber, an expanding-side passage that connects the expanding-side chamber with the expanding-side pressurizing chamber, a contracting-side passage that connects the contracting-side chamber with the contracting-side pressurizing chamber, a spring element configured to suppress displacement of the free piston, a cushion configured to collide with the free piston to suppress displacement of the free piston thereover when the free piston is displaced from the neutral position with respect to the housing by a predetermined displacement amount or more; and a cushion fixing member fixed to the housing, the cushion fixing member holding the cushion.

9 Claims, 6 Drawing Sheets

(51) Int. Cl.
     *F16F 9/504*     (2006.01)
     *F16F 9/512*     (2006.01)

(56)        References Cited

FOREIGN PATENT DOCUMENTS

JP      2012-052630 A   3/2012
JP      2012-137168 A   7/2012

* cited by examiner

SHOCK ABSORBER

TECHNICAL FIELD

This invention relates to a shock absorber.

BACKGROUND ART

A shock absorber was discussed in JP 2008-215459 A. This shock absorber includes a cylinder, a piston slidably inserted into the cylinder to partition the cylinder into an expanding-side chamber and a contracting-side chamber, a damping passage that connects the expanding-side chamber with the contracting-side chamber provided in the piston, a housing provided in a leading end of the piston rod to form a pressurizing chamber, a free piston slidably inserted into the pressurizing chamber to partition the pressurizing chamber into an expanding-side pressurizing chamber and a contracting-side pressurizing chamber, a coil spring that biases the free piston, an expanding-side passage that connects the expanding-side chamber with the expanding-side pressurizing chamber, and a contracting-side passage that connects the contracting-side chamber with the contracting-side pressurizing chamber.

Since the pressurizing chamber is partitioned by the free piston into the expanding-side pressurizing chamber and the contracting-side pressurizing chamber, the expanding-side chamber and the contracting-side chamber do not directly communicate with each other through the expanding-side passage and the contracting-side passage. However, as the free piston moves, a volume ratio between the expanding-side chamber and the contracting-side chamber changes, so that a liquid inside the pressurizing chamber accesses the expanding-side chamber and the contracting-side chamber depending on the movement amount of the free piston. Therefore, the pressurizing chamber appears such that the expanding-side chamber and the contracting-side chamber communicate with each other through the expanding-side passage and the contracting-side passage.

Such a shock absorber generates a strong damping force for a low frequency vibration input, and generates a weak damping force for a high frequency vibration input. As a result, the shock absorber may generate a strong damping force when the input vibration frequency is low, for example, when a vehicle turns, and may generate a weak damping force when the input vibration frequency is high, for example, when a vehicle travels on an uneven road surface. Therefore, the shock absorber can improve ride quality of a vehicle.

SUMMARY OF INVENTION

In the shock absorber described above, a step portion is provided in the inner circumference of the housing. When the free piston is displaced downwards so as to compress the contracting-side pressurizing chamber and reaches its movement limitation, the step portion collides with an edge of the contracting-side pressurizing chamber of the free piston, so that the downward displacement of the free piston is restricted. In addition, when the free piston is displaced upwards so as to compress the expanding-side pressurizing chamber and reaches its movement limitation, the upper end of the housing collides with an edge of the expanding-side pressurizing chamber of the free piston, so that the upward displacement of the free piston is restricted.

Therefore, since the displacement of the free piston is restricted to the stroke end, and a liquid does not pass through the pressurizing chamber when a large amplitude vibration is input, the shock absorber can exert a strong damping force to suppress squat or bottoming out.

However, a clunking sound may be generated, and a vehicle passenger may feel discomfort when the free piston collides with the step portion.

In view of the aforementioned problems, it is therefore an object of this invention to provide a shock absorber capable of suppressing generation of a clunking sound.

According to one aspect of the present invention, a shock absorber includes a cylinder, a piston slidably inserted into the cylinder, the piston partitioning the cylinder into an expanding-side chamber and a contracting-side chamber, a damping passage that connects the expanding-side chamber with the contracting-side chamber, a housing that forms a pressurizing chamber, a free piston slidably inserted into the pressurizing chamber, the free piston partitioning the pressurizing chamber into an expanding-side pressurizing chamber and a contracting-side pressurizing chamber, an expanding-side passage that connects the expanding-side chamber with the expanding-side pressurizing chamber, a contracting-side passage that connects the contracting-side chamber with the contracting-side pressurizing chamber, a spring element that positions the free piston in a neutral position with respect to the housing, the spring element exerting a biasing force for suppressing displacement of the free piston from the neutral position, a cushion that collides with the free piston to suppress displacement of the free piston thereover when the free piston is displaced from the neutral position with respect to the housing by a predetermined displacement amount or more; and a cushion fixing member fixed to the housing, the cushion fixing member holding the cushion.

DESCRIPTION OF EMBODIMENTS

Now, a description will be made for embodiments of this invention with reference to the accompanying drawings.

First, a description will be made for a first embodiment.

Figure 1:
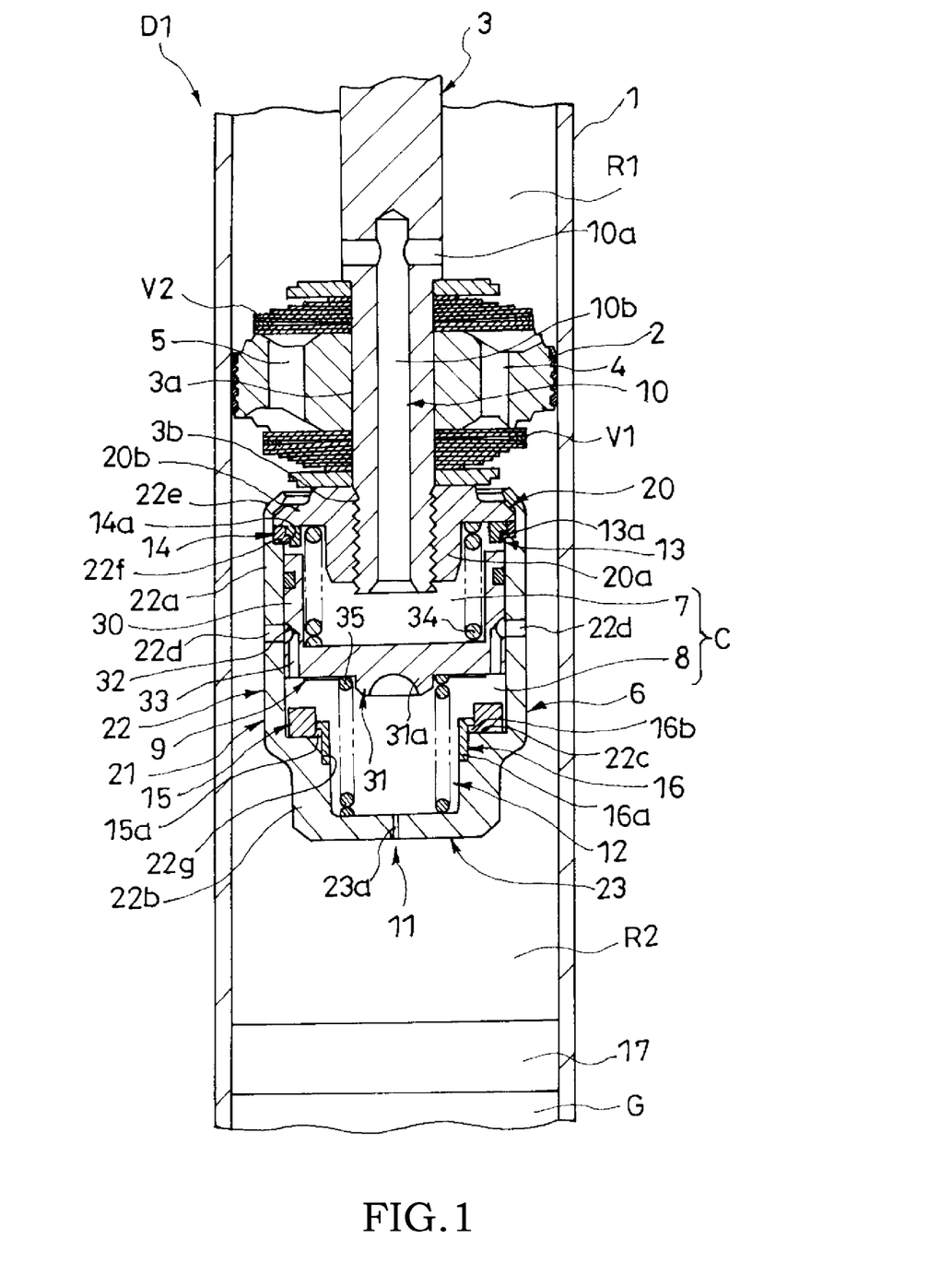
FIG. 1 is a vertical cross-sectional view illustrating a shock absorber according to a first embodiment of this invention.

Referring to FIG. 1, the shock absorber D1 includes a cylinder 1, a piston 2 slidably inserted into the cylinder 1 to partition the cylinder 1 into an expanding-side chamber R1 and a contracting-side chamber R2, damping passages 4 and 5 that connect the expanding-side chamber R1 with the contracting-side chamber R2, a housing 6 that forms a pressurizing chamber C, a free piston 9 slidably inserted into the housing 6 to partition the pressurizing chamber C into a expanding-side pressurizing chamber 7 and a contracting-side pressurizing chamber 8, an expanding-side passage 10 that connects the expanding-side chamber R1 with the expanding-side pressurizing chamber 7, a contracting-side passage 11 that connects the contracting-side chamber R2 with the contracting-side pressurizing chamber 8, a spring element 12 that positions the free piston 9 in a neutral position with respect to the housing 6 and exerts a biasing force for suppressing displacement of the free piston 9 from the neutral position, an expanding-side cushion 13 that collides with the free piston 9 to serve as a cushion for suppressing displacement of the free piston 9 to the expanding-side pressurizing chamber side when the free piston 9 is displaced from the neutral position to the expanding-side pressurizing chamber side with respect to the housing 6 by a predetermined displacement amount or more, an expanding-side cushion fixing member 14 fixed to the housing 6 to serve as a cushion fixing member for holding the expanding-side cushion 13, a contracting-side cushion 15 that collides with the free piston 9 to serve as a cushion for suppressing displacement of the free piston 9 to the contracting-side pressurizing chamber side when the free piston 9 is displaced from the neutral position to the contracting-side pressurizing chamber side with respect to the housing 6 by a predetermined displacement amount or more, and a contracting-side cushion fixing member 16 fixed to the housing 6 to serve as a cushion fixing member for holding the contracting-side cushion 15.

The shock absorber D1 further includes a piston rod 3 movably inserted into the cylinder 1. One end of the piston rod 3 is connected to the piston 2, and the other end as an upper end is slidably and axially supported by an annular rod guide (not shown) that seals the upper end of the cylinder 1. It is noted that the lower end of the cylinder 1 is sealed with a bottom member (not shown).

A liquid such as a hydraulic fluid is filled in the expanding-side chamber R1, the contracting-side chamber R2, and the pressurizing chamber C. A sliding partition 17 that makes sliding contact with the inner circumference of the cylinder 1 to partition the cylinder 1 into the contracting-side chamber R2 and the gas chamber G is provided in the lower side of the cylinder 1 shown in FIG. 1. It is noted that the liquid filled in the expanding-side chamber R1, the contracting-side chamber R2, and the pressurizing chamber C may include water, an aqueous solution, and the like.

The shock absorber D1 is a single-rod type shock absorber in which the piston rod 3 is inserted only to the expanding-side chamber R1. A volume of the piston rod 3 inserted to or extracted from the cylinder 1 as the shock absorber D1 expands or contracts is compensated by movement of the sliding partition 17 in a vertical direction of FIG. 1 caused by expansion or contraction of the gas volume inside the gas chamber G.

It is noted that, instead of the gas chamber G provided in the cylinder 1, a reservoir may be provided inside or outside the cylinder 1 to compensate for the volume of the piston rod 3 inserted into or extracted from the cylinder 1. When the reservoir is provided outside the cylinder 1, an outer tube that covers the outer circumference of the cylinder 1 may be provided so as to form a reservoir between the cylinder 1 and the outer tube and serve as a twin-tube type shock absorber, or a tank may separately be provided to form a reservoir. When a reservoir is provided, a partition member that partitions the inside into the contracting-side chamber R2 and the reservoir in order to increase a pressure of the contracting-side chamber R2 in a contracting operation of the shock absorber D1 and a base valve provided in the partition member to apply resistance to a liquid flowing from the contracting-side chamber R2 to the reservoir may be further provided. In addition, the shock absorber D may be a double-rod type instead of the single-rod type.

The piston 2 is connected to one end 3a, that is the lower end of FIG. 1, of the piston rod 3 movably inserted into the cylinder 1. The piston rod 3 protrudes outwards through the inner circumference of the annular rod guide (not shown) fixed to the upper end of the cylinder 1 in FIG. 1. It is noted that a gap between the piston rod 3 and the rod guide is sealed with a seal member (not shown), and the cylinder 1 is internally encapsulated in a liquid-tight manner.

The piston 2 is provided with damping passages 4 and 5 that connect the expanding-side chamber R1 with the contracting-side chamber R2. The lower end of the damping passage 4 in FIG. 1 is opened or closed by a leaf valve V1 lying under the piston 2 in FIG. 1. The upper end of the damping passage 5 in FIG. 1 is opened or closed by a leaf valve V2 lying under the piston 2 in FIG. 1.

The leaf valve V1 has an annular shape and is mounted in one end 3a of the piston rod 3 together with the piston 2. The leaf valve V1 is flexed as the liquid flows from the expanding-side chamber R1 to the contracting-side chamber R2 through the damping passage 4 during the expansion process of the shock absorber D in which the piston 2 moves upwards in FIG. 1, so as to open the damping passage 4 and apply resistance to a liquid flow, and closes the damping passage 4 for a reverse flow. That is, the damping passage 4 is a one-way passage that allows only a liquid flow directed from the expanding-side chamber R1 to the contracting-side chamber R2.

The leaf valve V2 has an annular shape and is mounted in one end 3a of the piston rod 3 together with the piston 2. The leaf valve V2 is flexed as the liquid flows from the contracting-side chamber R2 to the expanding-side chamber R1 through the damping passage 5 during the contraction process of the shock absorber D in which the piston 2 moves downwards in FIG. 1, so as to open the damping passage 5 and apply resistance to the liquid flow, and closes the damping passage 5 for the reverse flow. That is, the damping passage 5 is a one-way passage that allows only a flow directed from the contracting-side chamber R2 to the expanding-side chamber R1.

Therefore, the leaf valve V1 serves as an expansion-side damping valve for applying resistance to a liquid flowing through the damping passage 4 during the expansion process, whereas the leaf valve V2 serves as a contraction-side damping valve for applying resistance to a liquid flowing through the damping passage 5 during the contraction process.

If a plurality of damping passages 4 and 5 are provided as described above, each damping passage may be configured as a one-way passage such that the liquid flows only in the expansion process or the contraction process. Alternatively, the damping passage may be configured to allow a bidirectional flow and apply resistance to the liquid flow passing therethrough. In addition, as a damping valve for applying resistance to the liquid flow passing through the damping passage, other elements such as a poppet valve, an orifice, and a chalk may also be employed instead of the leaf valve described above. Furthermore, the damping passages 4 and 5 may be provided in positions other than the piston 2.

The pressurizing chamber C is defined by the housing 6 as a cavity screwed to a thread portion 3b formed in the outer circumference of the leading edge of the one end 3a of the piston rod 3. The housing 6 serves as a piston nut for fixing the piston 2 and the leaf valves V1 and V2 to the one end 3a of the piston rod 3.

The pressurizing chamber C formed in the housing 6 is divided by the free piston 9 slidably inserted into the pressurizing chamber C into an expanding-side pressurizing chamber 7 in the upper half of FIG. 1 and a contracting-side pressurizing chamber 8 in the lower half of FIG. 1. The free piston 9 may be displaced in a vertical direction of FIG. 1 with respect to the housing 6 inside the pressurizing chamber C.

The housing 6 is provided with a nut portion 20 screwed to a thread portion 3b formed in the one end 3a of the piston rod 3, and a bottomed cylindrical housing cylinder 21 having a tubular portion 22 hanging down from the outer circumference of the nut portion 20 and a bottom portion 23 that closes the lower end in FIG. 1 as an end portion of the tubular portion 22. The housing 6 defines the pressurizing chamber C inside the contracting-side chamber R2.

The inner circumference of the nut portion 20 is provided with a threaded tube 20a screwed to the thread portion 3b of the piston rod 3 and a brim 20b that is provided in the outer circumference of the threaded tube 20a and protrudes outwards.

The housing cylinder 21 has a bottomed cylindrical shape and is integrated with the nut portion 20 as an upper end opening of FIG. 1 is caulked to the outer circumference of the brim 20b of the nut portion 20. The housing cylinder 21 has a bottomed cylindrical shape having a tubular portion 22 hanging down from the brim 20b and a bottom portion 23 that closes an end portion of the tubular portion 22. The tubular portion 22 of the housing cylinder 21 has a large inner-diameter portion 22a that is formed in the nut portion side and makes sliding contact with the free piston 9, a small inner-diameter portion 22b formed oppositely to the nut portion side, and a step portion 22c provided between the large inner-diameter portion 22a and the small inner-diameter portion 22b. It is noted that the integration between the nut portion 20 and the housing cylinder 21 may be performed through other fabrication methods such as welding or screwing instead of the caulking.

It is noted that the outer circumference in at least a part of the tubular portion 22 of the housing cylinder 21 has a non-circular cross-sectional shape for allowing gripping with a tool (not shown). Such a shape may include any shape matching the tool, such as a partially notched shape or a hexagonal shape. As a result, it is possible to install the nut portion 20 to the thread portion 3b by gripping the outer circumference of the tubular portion 22 with a tool and rotating the housing 6 in a circumferential direction to exert a predetermined fastening torque to the nut portion 20.

The pressurizing chamber C and the contracting-side chamber R2 communicate with each other through an orifice 22d provided in a lateral side of the tubular portion 22, and the pressurizing chamber C and the contracting-side chamber R2 communicate with each other through an orifice 23a provided in the bottom portion 23. The expanding-side pressurizing chamber 7 communicates with the expanding-side chamber R1 through the expanding-side passage 10 extending from the lateral side of the piston rod 3 facing the expanding-side chamber R1 to the end portion of the one end 3a. The expanding-side passage 10 includes a longitudinal hole 10a opened to the lateral side of the piston rod 3 facing the expanding-side chamber R1 and a transverse hole 10b opened to the end portion of the one end 3a to communicate with the longitudinal hole 10a.

The free piston 9 inserted into the pressurizing chamber C is formed in a bottomed cylindrical shape having a sliding contact cylinder 30 making sliding contact with the large inner-diameter portion 22a of the tubular portion 22 of the housing cylinder 21, and a mirror portion 31 that closes the lower end of the sliding contact cylinder 30. The free piston 9 partitions the housing 6 into the expanding-side pressurizing chamber 7 communicating with the expanding-side chamber R1 and the contracting-side pressurizing chamber 8 communicating with the contracting-side chamber R2.

The free piston 9 has an annular recess 32 formed across the entire outer circumference of the sliding contact cylinder 30 and a communicating hole 33 that connects the annular recess 32 with the contracting-side pressurizing chamber 8. When the annular recess 32 faces the orifice 22d formed in the tubular portion 22 of the housing 6, the contracting-side chamber R2 communicates with the contracting-side pressurizing chamber 8. When the annular recess 32 does not face the orifice 22d, and the orifice 22d is closed by the sliding contact cylinder 30, the communication between the contracting-side chamber R2 and the contracting-side pressurizing chamber 8 through the orifice 22d is closed. The orifice 22d applies resistance to a flow of the passing liquid to generate a predetermined pressure loss and a pressure difference between the contracting-side chamber R2 and the contracting-side pressurizing chamber 8.

The orifice 23a formed in the bottom portion 23 of the housing cylinder 21 also serves as an aperture passage so as to apply resistance to the flow of the passing liquid to generate a predetermined pressure loss and a pressure difference between the contracting-side chamber R2 and the contracting-side pressurizing chamber 8. It is noted that the orifice 23a is not closed by the free piston 9 and is opened at all times. That is, when the orifice 22d is opened, the contracting-side pressurizing chamber 8 communicates with the contracting-side chamber R2 through the orifices 22d and 23a. When the orifice 22d is closed, the contracting-side pressurizing chamber 8 communicates with the contracting-side chamber R2 only through the orifice 23a. The contracting-side passage 11 is formed by the orifices 22d and 23a, the annular recess 32, and the communicating hole 33.

Furthermore, an expanding-side spring 34 which is a coil spring as a spring element 12 is interposed in a compressed state between the brim 20b of the nut portion 20 and the mirror portion 31 of the free piston 9 inside the expanding-side pressurizing chamber 7. A contracting-side spring 35 which is a coil spring as a spring element 12 is interposed in a compressed state between the bottom portion 23 and the mirror portion 31 of the free piston 9 inside the contracting-side pressurizing chamber 8. The expanding-side spring 34 and the contracting-side spring 35 exert a biasing force for suppressing displacement of the free piston 9 with respect to the housing 6. The free piston 9 is interposed vertically between the expanding-side spring 34 and the contracting-side spring 35 so as to be positioned in a predetermined neutral position inside the pressurizing chamber C. As the free piston 9 is displaced from the neutral position, the expanding-side spring 34 and the contracting-side spring 35 exerts a biasing force for returning the free piston 9 to the neutral position. It is noted that the neutral position does not refer to a center of the pressurizing chamber C in the axial direction, but refers to a position of the free piston 9 determined by the spring element 12.

It is noted that other elements may also be employed as the spring element 12 instead of the coil spring if it can exert a biasing force for positioning the free piston 9 in the neutral position. For example, the free piston 9 may be elastically supported using an elastic body such as a disc spring. Alternatively, one end of the spring element may be connected to the free piston 9 using a single spring element, and the other end may be fixed to the nut portion 20 or the bottom portion 23.

The expanding-side spring 34 is freely fitted into the inner circumference of the sliding contact cylinder 30 of the free piston 9 and is positioned in a predetermined radial position. The upper end of the contracting-side spring 35 of FIG. 1 is freely fitted to a protrusion 31a formed in the lower end of the mirror portion 31 of the free piston 9 so as to be positioned in a predetermined radial position. The expanding-side spring 34 and the contracting-side spring 35 are centered together by the free piston 9 so as to prevent a positional deviation with respect to the free piston 9. As a result, the expanding-side spring 34 and the contracting-side spring 35 can stably exert a biasing force to the free piston 9.

The free piston 9 is positioned in the neutral position inside the housing 6 when it is elastically supported by the expanding-side spring 34 and the contracting-side spring 35 inside the housing 6, and a force other than the biasing force caused by the expanding-side spring 34 and the contracting-side spring 35 is not applied. When the free piston 9 is in the neutral position, the annular recess 32 inevitably faces the orifice 22d so that the contracting-side pressurizing chamber 8 and the contracting-side chamber R2 communicate with each other. As the free piston 9 is displaced from the neutral position, the outer circumference of the sliding contact cylinder 30 of the free piston 9 perfectly overlaps with the orifice 22d to close the orifice 22d.

It is noted that the displacement amount from the neutral position for starting the free piston 9 to close the orifice 22d may be set arbitrarily. In addition, the displacement amount of the free piston 9 from the neutral position to the expanding-side pressurizing chamber 7 side, that is, upwards in FIG. 1 for starting to close the orifice 22d may be set to be different from the displacement amount of the free piston 9 from the neutral position to the contracting-side pressurizing chamber 8 side, that is, downwards in FIG. 1 for starting to close the orifice 22d. It is noted that the number of the orifices 22d is not limited to two, but may be set to any other number. An annular recess 32 communicating with the contracting-side chamber R2 may be provided in the inner circumference of the tubular portion 22, and an orifice that connects the outer circumference side of the free piston 9 with the contracting-side pressurizing chamber 8 may be provided in the free piston 9.

In the shock absorber D, the expanding-side cushion 13 is fixed to the housing 6 using the expanding-side cushion fixing member 14, and the contracting-side cushion 15 is fixed to the housing 6 using the contracting-side cushion fixing member 16.

The expanding-side cushion 13 formed of an annular elastic body such as rubber is stacked on the brim 20b of the nut portion 20 and faces to the upper end of the sliding contact cylinder 30 of the free piston 9 in FIG. 1. As the free piston 9 is displaced from the neutral position upwards in FIG. 1 by a predetermined displacement amount such that the expanding-side pressurizing chamber 7 is compressed, the sliding contact cylinder 30 of the free piston 9 collides with the expanding-side cushion 13 so as to suppress upward displacement of the free piston 9 thereover in FIG. 1. In addition, the expanding-side cushion 13 is provided with an annular recess 13a in the outer circumference in the free piston-side end which is the lower end of FIG. 1.

The expanding-side cushion fixing member 14 having an annular shape is stacked on the brim 20b. When the opening end of the tubular portion 22 of the housing cylinder 21 is caulked and is fixed to the brim 20b of the nut portion 20, the expanding-side cushion fixing member 14 is gripped by the bent opening end of the tubular portion 22 together with the brim 20b and is fixed to the housing 6. A thin bending portion 22e where caulking is performed is provided in the upper end of the large inner-diameter portion 22a of the tubular portion 22 in FIG. 1. By providing the bending portion 22e, a second step portion 22f is provided in the inner circumference of the large inner-diameter portion 22a. The expanding-side cushion fixing member 14 lies on the second step portion 22f, and the brim 20b of the nut portion 20 lies over the expanding-side cushion fixing member 14 in FIG. 1. In this manner, by caulking the bending portion 22e from the outer circumference side while the expanding-side cushion fixing member 14 and the brim 20b lie on the second step portion 22f, the expanding-side cushion fixing member 14 and the nut portion 20 are gripped by the bending portion 22e and the second step portion 2f after deformation and are fixed to the housing 6.

The inner circumference of the free piston-side end of the expanding-side cushion fixing member 14 is provided with a flange-like fixing portion 14a protruding to the inner circumference side. The fixing portion 14a is fitted to the annular recess 13a provided in the expanding-side cushion 13 to fix the expanding-side cushion 13 to the housing 6. It is noted that the fixing portion 14a may have any shape other than the flange if it can fix the expanding-side cushion 13 to the housing 6. In addition, although the fixing portion 14a does not necessarily have an annular shape having no notch in the circumferential direction, the annular fixing portion 14a can reasonably suppress deformation to the inner circumference side when the expanding-side cushion 13 is compressed. Therefore, it is possible to prevent degradation of durability of the expanding-side cushion 13.

In this manner, the expanding-side cushion fixing member 14 prevents the expanding-side cushion 13 from being removed from the housing 6. When the housing cylinder 21 is caulked and fixed to the brim 20b of the nut portion 20, the expanding-side cushion fixing member 14 is caulked together with the brim 20b and is integrated with the housing cylinder 21. Therefore, it is possible to facilitate a process of fixing the expanding-side cushion fixing member 14 to the housing 6 and thus reduce manpower and cost.

The contracting-side cushion 15 formed of an annular elastic body such as rubber is stacked on the step portion 22c of the tubular portion 22 of the housing cylinder 21 and faces to the outer circumference of the lower end of the free piston 9 in FIG. 1. As the free piston 9 is displaced from the neutral position downwards in FIG. 1 by a predetermined displacement amount such that the contracting-side pressurizing chamber 8 is compressed, the lower end of the free piston 9 of FIG. 1 collides with the contracting-side cushion 15 so as to suppress downward displacement of the free piston 9 thereover in FIG. 1. In addition, the contracting-side cushion 15 is provided with a flange portion 15a protruding to the inner circumference side opposite to the free piston in the inner circumference.

The contracting-side cushion fixing member 16 has a tubular shape and is provided with a press fitting portion 16a in the side opposite to the free piston with respect to the center. The contracting-side cushion fixing member 16 is integrated with the housing 6 by forcibly inserting the press fitting portion 16a into the inner circumference of the small inner-diameter portion 22b of the housing cylinder 21. An annular fitting recess 22g is formed in the upper inner circumference of the small inner-diameter portion 22b in FIG. 1, so that the press fitting portion 16a is forcibly inserted into the fitting recess 22g. As a result, since the press fitting portion 16a does not protrude to the inner circumference side over the small inner-diameter portion 22b, it is possible to prevent interference between the press fitting portion 16a and the contracting-side spring 35. It is noted that, if the interference with the contracting-side spring 35 can be prevented, it is not necessary to form the fitting recess 22g in the tubular portion 22.

The contracting-side cushion fixing member 16 is provided with a flange-like fixing portion 16b having an outer diameter increasing toward the contracting-side cushion side and a tubular shape in the free piston side from the press fitting portion 16a. By catching the fixing portion 16b in the flange portion 15a of the contracting-side cushion 15, it is possible to prevent the contracting-side cushion 15 from being removed from the housing 6.

In this manner, the contracting-side cushion 15 is fixed to the housing 6 by fitting the contracting-side cushion fixing member 16 to the inner circumference of the contracting-side cushion 15. As a result, since it is possible to restrict deformation of the contracting-side cushion 15 to the inner circumference side as well as the outer circumference side caused by the tubular portion 22 and the contracting-side cushion fixing member 16 when the contracting-side cushion 15 is compressed by the free piston 9, it is possible to suppress deterioration of the contracting-side cushion 15. In addition, since the contracting-side cushion fixing member 16 is forcibly inserted into the small inner-diameter portion 22b instead of the sliding contact surface of the free piston 9, the large inner-diameter portion 22a as a sliding surface of the free piston 9 is not damaged, and it is possible to prevent a process of assembling the contracting-side cushion fixing member 16 from influencing on a damping characteristic of the shock absorber D1. It is noted that a small gap is provided between the contracting-side cushion 15 and the large inner-diameter portion 22a of the tubular portion 22 so as to facilitate a process of installing the contracting-side cushion 15 to the housing 6.

A displacement amount of the free piston 9 from the neutral position when the expanding-side cushion 13 starts colliding with the sliding contact cylinder 30 of the free piston 9 and a displacement amount of the free piston 9 from the neutral position when the contracting-side cushion 15 starts colliding with the lower end of the free piston 9 can be set arbitrarily to either the same value or different values. The installation positions of the expanding-side cushion 13 and the contracting-side cushion 15 in the housing 6 may change appropriately depending on the shapes of the housing 6 and the free piston 9 if the expanding-side cushion 13 and the contracting-side cushion 15 can be installed in the housing 6 and collide with the free piston 9. It is noted that, in order to obtain an effect of reducing a damping force, it is preferable that the stroke of the free piston 9 be set to be long. Therefore, it is preferable that the free piston 9 collide with the expanding-side cushion 13 and the contracting-side cushion 15 near the stroke end. In addition, the fixing portion 16b does not necessarily have a cylindrical shape having no notch in the circumferential direction if the contracting-side cushion 15 can be fixed to the housing 6. If the fixing portion 16b has a cylindrical shape, it is possible to reasonably suppress deformation to the inner circumference side when the contracting-side cushion 15 is compressed. Therefore, it is possible to prevent degradation of durability of the contracting-side cushion 15.

Figure 2:
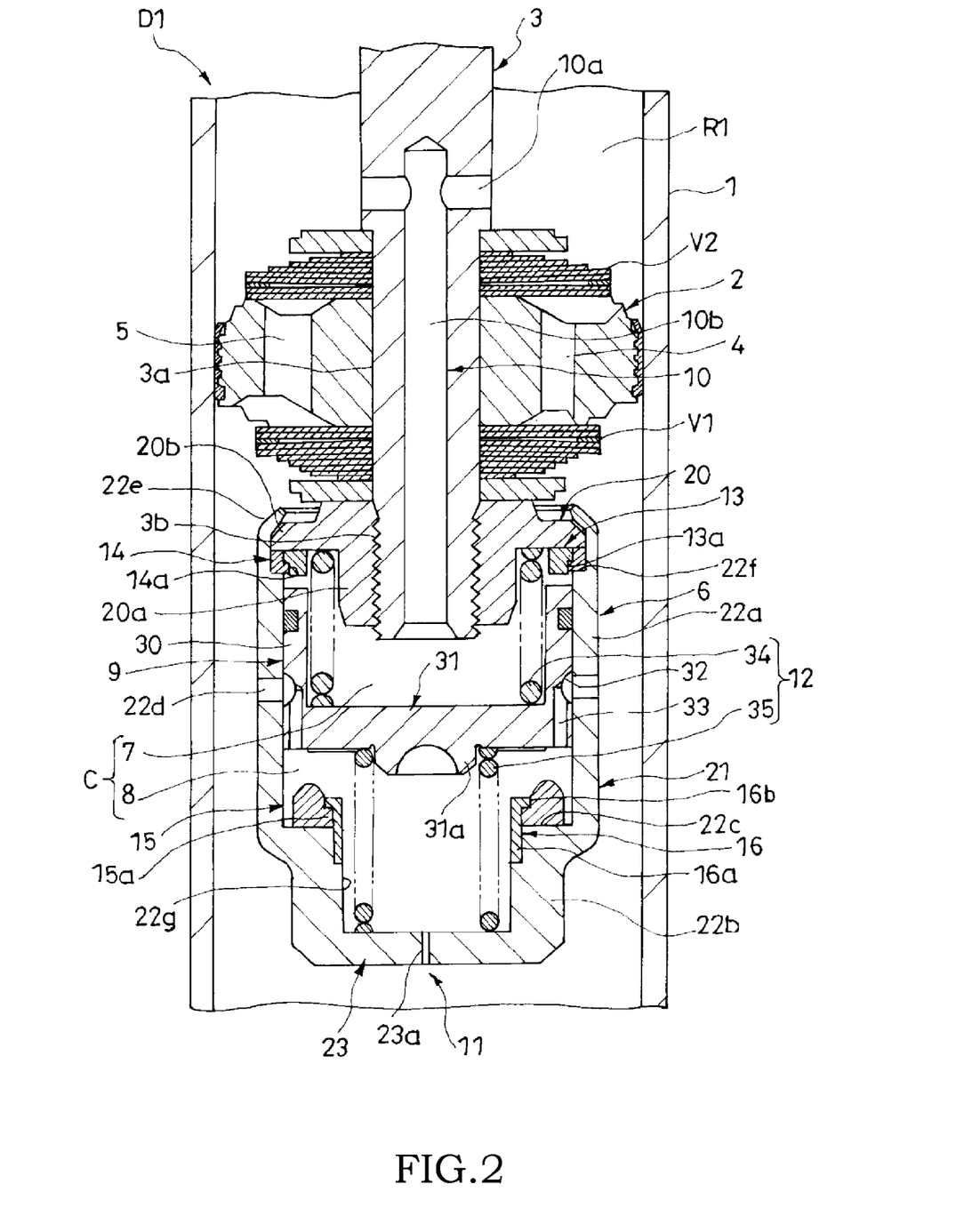
FIG. 2 is a partially enlarged vertical cross-sectional view illustrating a shock absorber according to a modification of the first embodiment of this invention.

FIG. 2 is a partially enlarged vertical cross-sectional view illustrating the shock absorber D1 according to a modification.

In this shock absorber D1, the contracting-side cushion 15 is formed such that a cross-sectional shape of the free piston-side end is tapered. As a result, since the contact area between the contracting-side cushion 15 and the free piston 9 is reduced, it is possible to reduce a contact noise generated when the contracting-side cushion 15 makes contact with the free piston 9.

Instead of the flange portion 15a provided in the inner circumference of the contracting-side cushion 15 opposite to the free piston, a tapered surface may be provided in the contracting-side cushion 15 such that the inner diameter is reduced toward the side opposite to the free piston 9, and a tapered portion may be provided in the outer circumference of the free piston side of the contracting-side cushion fixing member 16 such that the outer diameter increases toward the free piston-side end. As a result, as the tapered portion of the contracting-side cushion fixing member 16 is fitted to the tapered surface of the contracting-side cushion 15, it is possible to prevent the contracting-side cushion 15 from being removed from the housing 6. Similarly, in this case, since the tubular portion 22 and the contracting-side cushion fixing member 16 restrict deformation of the contracting-side cushion 15 to the inner circumference side and deformation to the outer circumference side, it is possible to suppress deterioration of the contracting-side cushion 15.

The fixing portion 16b does not necessarily have an annular shape having no notch in the circumferential direction. However, if the fixing portion 16b has an annular shape, it is possible to reasonably suppress deformation of the contracting-side cushion 15 to the inner circumference side when the contracting-side cushion 15 is compressed. Therefore, it is possible to prevent degradation of durability of the contracting-side cushion 15.

Figure 3:
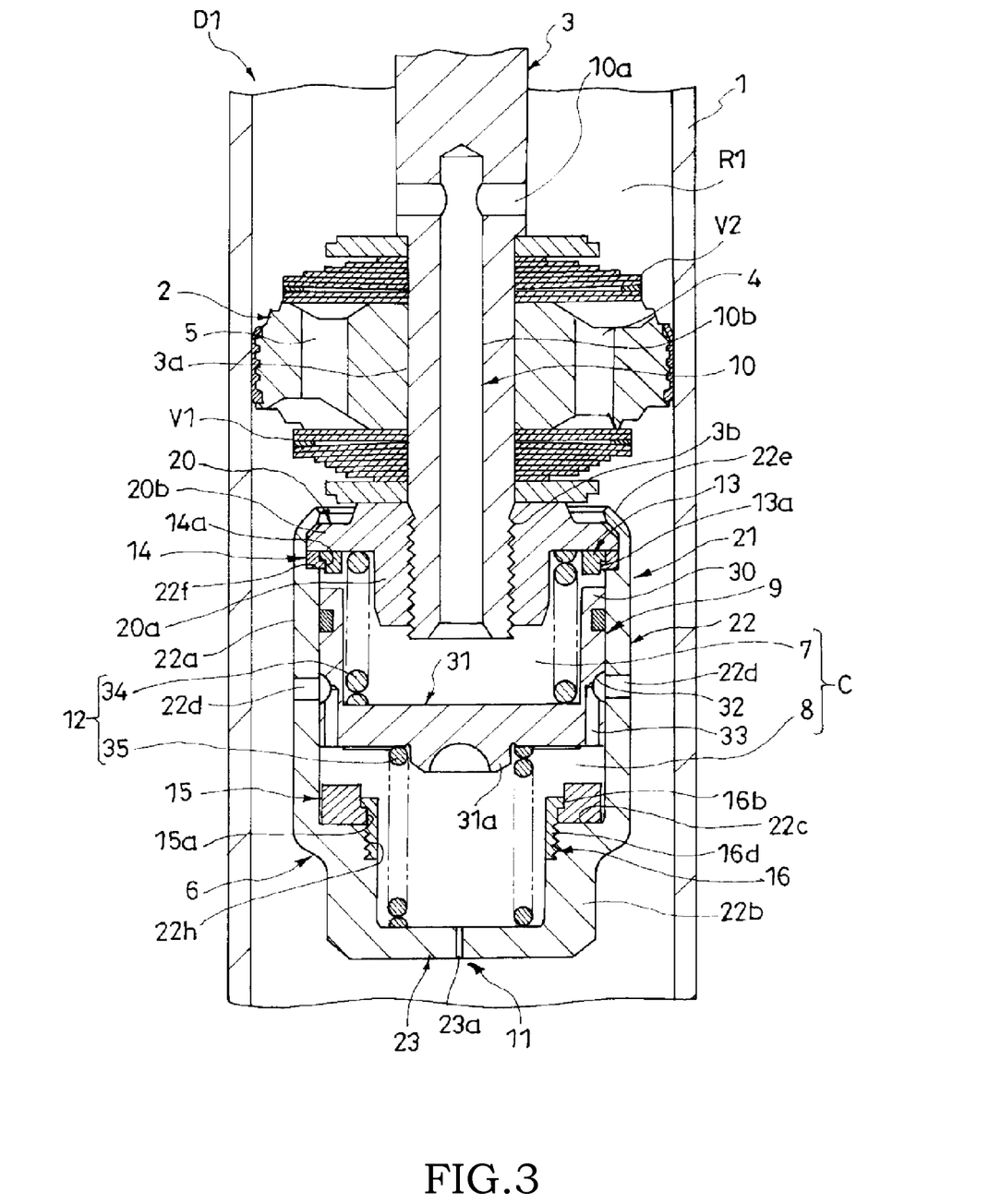
FIG. 3 is a partially enlarged vertical cross-sectional view illustrating a shock absorber according to a modification of the first embodiment of this invention.

FIG. 3 is a partially enlarged vertical cross-sectional view illustrating a shock absorber D1 according to a modification.

In this shock absorber D1, the contracting-side cushion fixing member 16 is not forcibly inserted into the inner circumference of the small inner-diameter portion 22b. Instead, the contracting-side cushion fixing member 16 is screwed to the inner circumference of the small inner-diameter portion 22b. The outer circumference of the contracting-side cushion fixing member 16 is provided with a thread portion 16d instead of the press fitting portion 16a, and the inner circumference of the small inner-diameter portion 22b is provided with a thread portion 22h. As the thread portions 16d and 22h are screwed together, the housing 6 and the contracting-side cushion fixing member 16 are integrated with each other.

It is noted that, although the contracting-side cushion fixing member 16 is fixed to the contracting-side cushion 15 by catching the fixing portion 16b in the flange portion 15a, the fixing portion 16b may have any other shape if it match the shape of the contracting-side cushion 15. In addition, although the fixing portion 16b does not necessarily have an annular shape having no notch in the circumferential direction, the annular fixing portion 16b can reasonably suppress deformation of the contracting-side cushion 15 to the inner circumference side when the contracting-side cushion 15 is compressed. Therefore, it is possible to prevent degradation of durability of the contracting-side cushion 15.

As described above, since the pressurizing chamber C is partitioned by the free piston 9 into the expanding-side pressurizing chamber 7 and the contracting-side pressurizing chamber 8, the expanding-side chamber R1 and the contracting-side chamber R2 do not directly communicate through the expanding-side passage 10 and the contracting-side passage 11. However, as the free piston 9 moves, a volume ratio between the expanding-side chamber R1 and the contracting-side chamber R2 changes, so that the liquid inside the pressurizing chamber C accesses the expanding-side chamber R1 and the contracting-side chamber R2 depending on the movement amount of the free piston 9. Therefore, the pressurizing chamber C appears such that the expanding-side chamber R1 and the contracting-side chamber R2 communicate through the expanding-side passage 10 and the contracting-side passage 11.

In the shock absorber D1, a strong damping force can be generated for a low frequency vibration input, and a weak damping force can be generated for a high frequency vibration input. As a result, the shock absorber D1 can generate a strong damping force when the input vibration frequency is low, for example, when a vehicle turns. Meanwhile, the shock absorber D1 can generate a weak damping force when the input vibration frequency is high, for example, when a vehicle travels on an uneven road surface. Therefore, the shock absorber D1 can improve ride quality of a vehicle.

Here, assuming that "P" denotes a pressure difference between the expanding-side chamber R1 and the contracting-side chamber R2 during expansion or contraction of the shock absorber D1, "Q" denotes a flow rate of the liquid flowing from the expanding-side chamber R1, "C1" denotes a coefficient of the relationship between the pressure difference P and the flow rate Q1 of the liquid passing through the damping passages 4 and 5, "P1" denotes a pressure of the expanding-side pressurizing chamber 7, "C2" denotes a coefficient of the relationship between a difference between the pressure difference P and the pressure P1 and a flow rate Q2 of the liquid flowing to the expanding-side pressurizing chamber 7 from the expanding-side chamber R1, "P2" denotes a pressure of the contracting-side pressurizing chamber 8, "C3" denotes a coefficient of the relationship between the pressure P2 and the flow rate Q2 of the liquid flowing to the contracting-side chamber R2 from the contracting-side pressurizing chamber 8, "A" denotes a pressure-receiving cross-sectional area of the free piston 9, "X" denotes a displacement of the free piston 9 with respect to the pressurizing chamber C, "K" denotes a spring constant of the spring element 12, that is, a synthetic spring constant of the expanding-side spring 34 and the contracting-side spring 35, and "s" denotes a Laplace operator, a transfer function of the pressure difference P against the flow rate Q can be obtained as follows.

[Equation 1]

$$G(s) = \frac{P(s)}{Q(s)} = \frac{C1\{1 + A^2(C2+C3)s/K\}}{1 + A^2(C1+C2+C3)s/K} \quad (1)$$

By substituting the Laplace operator s of the transfer function of Equation 1 with "jω," an absolute value of the frequency transfer function G(jω) can be obtained as follows.

[Equation 2]

$$|G(j\omega)| = \frac{C1[K^4 + K^2A^4\{2(C2+C3)(C1+C2+C3)+C1^2\}\omega^2 + A^8(C2+C3)^2(C1+C2+C3)^2\omega^4]^{1/2}}{K^2 + A^4(C1+C2+C3)^2\omega^2} \quad (2)$$

As shown in Equations 1 and 2, a frequency characteristic of the transfer function of the pressure difference P against the flow rate Q in the shock absorber D1 has two break point frequencies, "$F_a = K/\{2\pi A^2(C1+C2+C3)\}$" and "$F_b = K/\{2\pi A^2(C2+C3)\}$." In addition, a gain of the transfer function is approximated to "C1" within a range of $F<F_a$, gradually decreases from "C1" to "C1(C2+C3)/(C1+C2+C3)" within a range of $F_a \leq F \leq F_b$, and becomes constant within a range of $F>F_b$. That is, a frequency characteristic of the transfer function of the pressure difference P against the flow rate Q changes such that the gain of the transfer function increases in a low frequency range, and decreases in a high frequency range.

Figure 4:
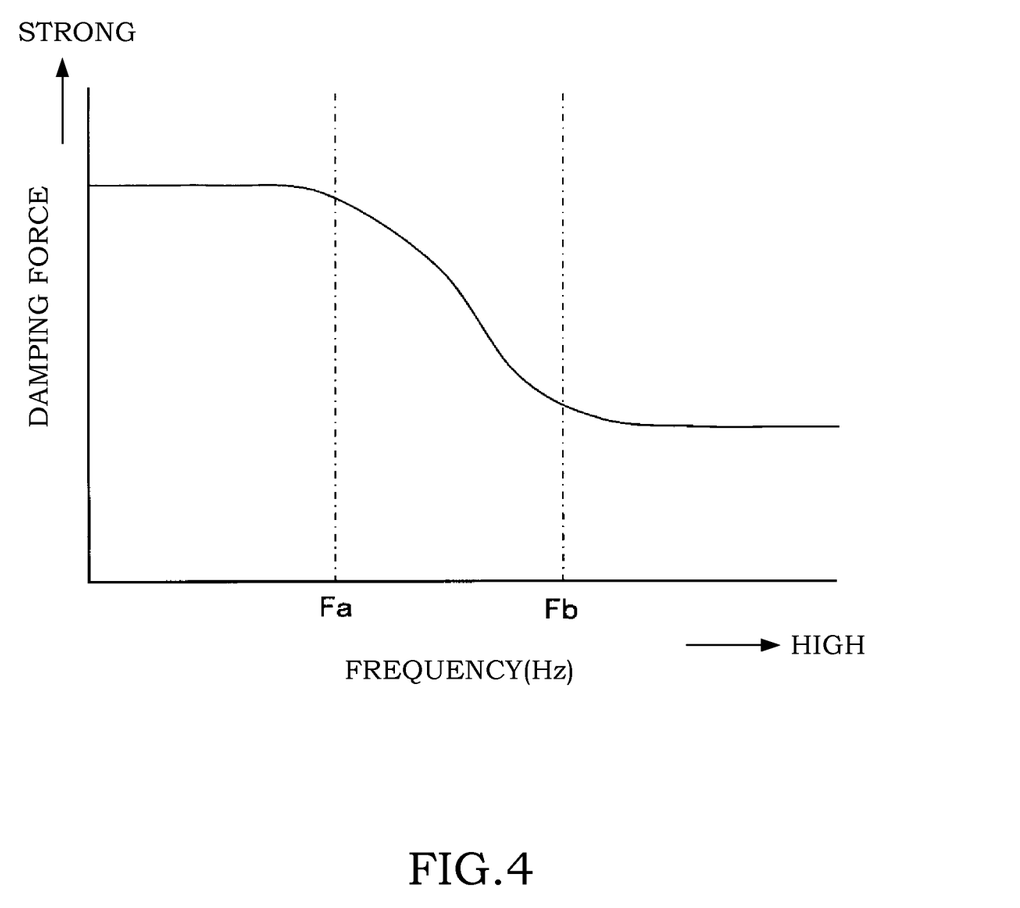
FIG. 4 is a diagram illustrating a characteristic of the damping force against an input frequency of the shock absorber.

Therefore, the shock absorber D1 can generate a strong damping force for a low frequency vibration input, and can generate a weak damping force for a high frequency vibration input by exerting a damping force reduction effect as illustrated in FIG. 4. As a result, the shock absorber D1 can generate a strong damping force when the input vibration frequency is low, for example, when a vehicle turns, and can generate a weak damping force when the input vibration frequency is high, for example, when a vehicle travels on an uneven road surface. Therefore, the shock absorber D1 can improve ride quality of a vehicle.

If the free piston 9 is displaced until the orifice 22d is closed from the neutral position, a flow resistance of the contracting-side passage 11 gradually increases until the orifice 22d is perfectly closed after starting to close. Accordingly, a movement velocity of the free piston 9 to the stroke end decreases, and an apparent movement amount of the liquid between the expanding-side chamber R1 and the contracting-side chamber R2 through the pressurizing chamber C also decreases, so that the amount of the liquid passing through the damping passages 4 and 5 increases accordingly, and the damping force generated in the shock absorber D1 gradually increases regardless of the amplitude of the vibration frequency.

Therefore, if displacement of the free piston 9 from the neutral position is large, and the orifice 22d is closed, displacement of the free piston 9 to the stroke end is suppressed, so that it is possible to prevent the shock absorber D1 from abruptly changing from a low damping force state to a high damping force state when a high frequency vibration is input. Therefore, it is possible to prevent a passenger from feeling discomfort due to a shock caused by a change of the damping force. It is noted that, although the area of the flow path of the contracting-side passage 11 is reduced so that a flow resistance gradually increases as the free piston 9 is displaced from the neutral position, a flow resistance of the expanding-side passage 10 may also be set to increase in addition or instead.

If the shock absorber D1 receives a large amplitude vibration in a contracting direction, and the free piston 9 is displaced from the neutral position to the expanding-side pressurizing chamber side over a predetermined displacement amount, the free piston 9 collides with the expanding-side cushion 13, and displacement to the expanding-side pressurizing chamber side thereover is suppressed. As a result, a displacement velocity of the free piston 9 toward the expanding-side pressurizing chamber side decreases, so that it is possible to prevent a direct collision between the free piston 9 and the housing 6 and thus prevent generation of a clunking sound.

If the shock absorber D1 receives a large amplitude vibration in an expanding direction, and the free piston 9 is displaced from the neutral position to the contracting-side pressurizing chamber side over a predetermined displacement amount, the free piston 9 collides with the contracting-side cushion 15, and displacement to the contracting-side pressurizing chamber side thereover is suppressed. As a result, a displacement velocity of the free piston 9 toward the contracting-side pressurizing chamber side decreases, so that it is possible to prevent a direct collision between the free piston 9 and the housing 6 and thus prevent generation of a clunking sound.

In this manner, by providing the expanding-side cushion 13 and the contracting-side cushion 15 in the shock absorber D1, it is possible to prevent generation of a clunking sound and prevent a vehicle passenger from feeling discomfort caused by a clunking sound. Therefore, it is possible to improve ride quality of a vehicle.

The shock absorber D1 is provided with the expanding-side cushion fixing member 14 for fixing the expanding-side cushion 13 to the housing 6, and the contracting-side cushion fixing member 16 for fixing the contracting-side cushion 15 to the housing 6. As a result, it is possible to more reliably prevent the expanding-side cushion 13 and the contracting-side cushion 15 from being deviated with respect to the housing 6 or from being removed from the housing 6. Therefore, it is possible to prevent a change of the position of the free piston 9 abutting onto the expanding-side cushion 13 and the contracting-side cushion 15. Therefore, it is possible to stably provide a desired damping characteristic.

Next, a description will be made for a shock absorber D2 according to a second embodiment with reference to FIG. 5.

The shock absorber D2 is different from the shock absorber D1 of the first embodiment in an expanding-side cushion 41, an expanding-side cushion fixing member 42, a contracting-side cushion 43, and a contracting-side cushion fixing member 44. Other elements are similar to those of the shock absorber D1. Therefore, like reference numerals denote like elements, and descriptions thereof will not be repeated.

Figure 5:
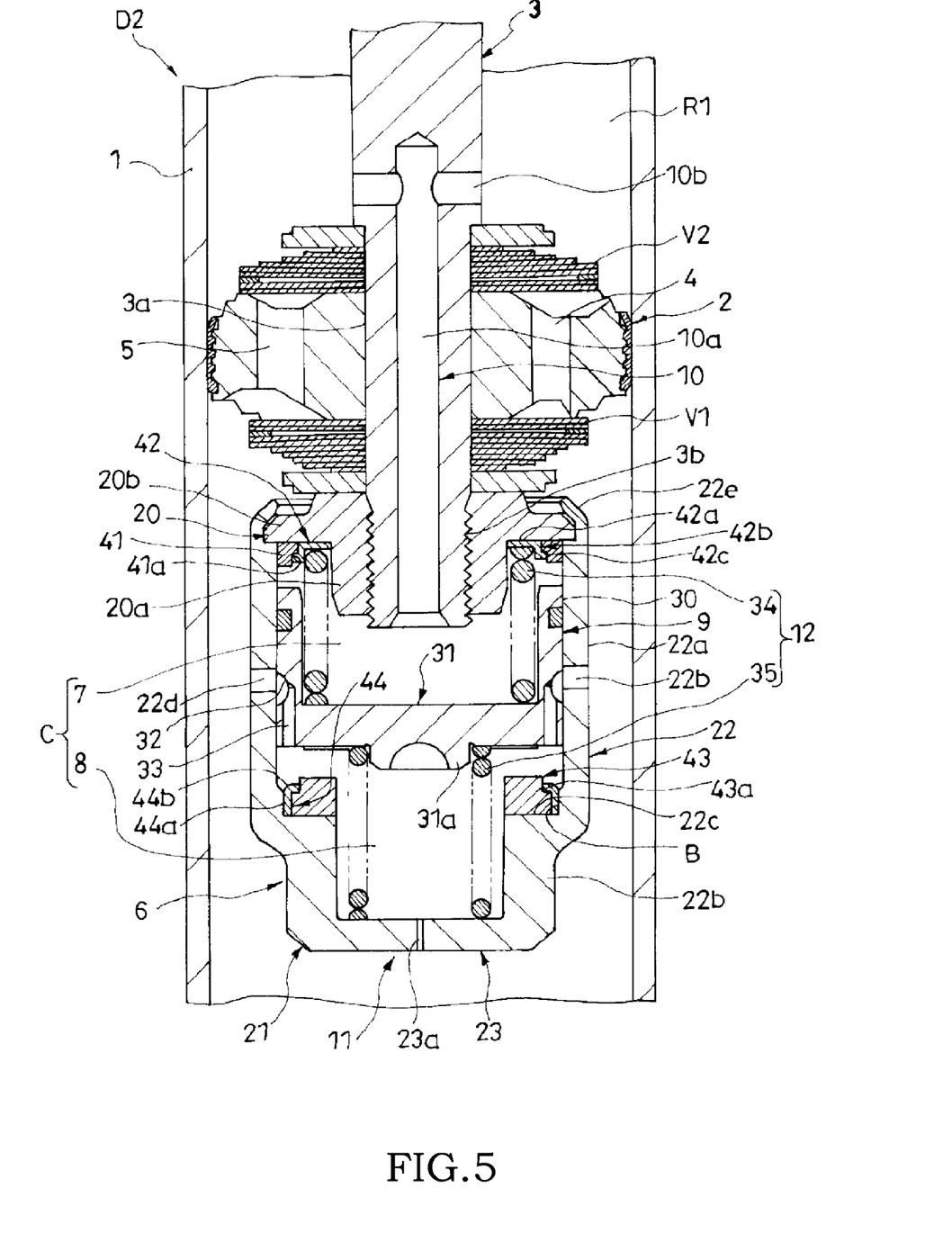
FIG. 5 is a partially enlarged vertical cross-sectional view illustrating a shock absorber according to a second embodiment of this invention.

The expanding-side cushion 41 formed of an annular elastic body such as rubber is stacked on the brim 20b of the nut portion 20 and faces to the upper end of the sliding contact cylinder 30 of the free piston 9 in FIG. 5. As the free piston 9 is displaced from the neutral position to compress the expanding-side pressurizing chamber 7 upwards in FIG. 5 by a predetermined displacement amount, the sliding contact cylinder 30 of the free piston 9 collides with the expanding-side cushion 41, so as to suppress the free piston 9 from being displaced thereover in FIG. 5. In addition, the expanding-side cushion 41 is provided with an annular recess 41a in the inner circumference of the free piston-side end which is the lower end in FIG. 5.

The expanding-side cushion fixing member 42 having an annular shape is stacked on the brim 20b. The expanding-side cushion fixing member 42 is provided with an annular disc-like seat portion 42a interposed between the brim 20b and the expanding-side spring 34, and a fixing portion 42b erected from the outer circumference of the seat portion 42a downwards in FIG. 5 and fitted to the inner circumference of the expanding-side cushion 41. The fixing portion 42b is provided with a flange 42c protruding to the outer circumference. As the flange 42c is fitted to the annular recess 41a, the expanding-side cushion 41 is fixed to the housing 6. It is noted that a portion of the fixing portion 42b fitted to the annular recess 41a may have any shape other than the flange 42c if the expanding-side cushion 41 can be fixed to the housing 6.

By providing the expanding-side cushion fixing member 42 in this manner, it is possible to prevent the expanding-side cushion 41 from being removed from the housing 6. In addition, since the expanding-side cushion fixing member 42 is fixed to the housing 6 while being interposed between the expanding-side spring 34 and the brim 20b of the nut portion 20, it is possible to facilitate a process of installing the expanding-side cushion fixing member 42 in the housing 6 and reduce manpower and cost.

The contracting-side cushion 43 formed of an annular elastic body such as rubber is stacked on the step portion 22c of the tubular portion 22 of the housing cylinder 21 and faces to the outer circumference of the lower end of the free piston 9 in FIG. 5. As the free piston 9 is displaced from the neutral position upwards in FIG. 5 by a predetermined displacement amount such that the contracting-side pressurizing chamber 8 is compressed, the lower end of the free piston 9 in FIG. 5 collides with the contracting-side cushion 43 so as to suppress downward displacement of the free piston 9 thereover in FIG. 5. In addition, the contracting-side cushion 43 is provided with an annular recess 43a in the outer circumference of the free-piston-side end.

The contracting-side cushion fixing member 44 is provided with an annular press fitting portion 44a and a flange-like fixing portion 44b protruding inwards from the inner circumference of the free piston-side end of the press fitting portion 44a. The contracting-side cushion fixing member 44 is integrated with the housing 6 by forcibly inserting the press fitting portion 44a into the inner circumference of the large inner-diameter portion 22a of the housing cylinder 21. Since the inner diameter of a portion B of the large inner-diameter portion 22a where the press fitting portion 44a thereunder in FIG. 5 is forcibly inserted is smaller than other portions, a surface of the large inner-diameter portion 22a making sliding contact with the free piston 9 is not damaged when the press fitting portion 44a is forcibly inserted into the large inner-diameter portion 22a. In addition, according to this embodiment, since the contracting-side cushion fixing member 44 is not fixed to the small inner-diameter portion 22b, the fitting recess 22g of the first embodiment is not provided.

The contracting-side cushion fixing member 44 prevents the contracting-side cushion 15 from being removed from the housing 6 by fitting the fixing portion 44b to the annular recess 43a provided in the outer circumference of the contracting-side cushion 43. It is noted that, although the fixing portion 44b of the contracting-side cushion fixing member 44 does not necessarily have an annular shape having no notch in the circumferential direction if it matches the shape of the contracting-side cushion 43, the annular fixing portion 44b can reasonably suppress deformation to the inner circumference side when the contracting-side cushion 43 is compressed. Therefore, it is possible to prevent degradation of durability of the contracting-side cushion 43.

In this manner, the contracting-side cushion 43 is fixed to the housing 6 by fitting the contracting-side cushion fixing member 44 to the outer circumference of the contracting-side cushion 43. As a result, deformation of the contracting-side cushion 43 to the outer circumference side is restricted when the contracting-side cushion 43 is compressed by the free piston 9. Therefore, it is possible to prevent the contracting-side cushion 43 from being stuck between the free piston 9 and the tubular portion 22 during collision with the free piston 9.

Similar to the shock absorber D1 of the first embodiment, the shock absorber D2 is provided with the expanding-side cushion 41 and the contracting-side cushion 43. As a result, it is possible to prevent generation of a clunking sound and prevent a vehicle passenger from felling discomfort caused by the clunking sound. Therefore, it is possible to improve ride quality of a vehicle.

Furthermore, the shock absorber D2 is provided with the expanding-side cushion fixing member 42 for fixing the expanding-side cushion 41 to the housing 6 and the contracting-side cushion fixing member 44 for fixing the contracting-side cushion 43 to the housing 6. As a result, it is possible to more reliably prevent the expanding-side cushion 41 and the contracting-side cushion 43 from being deviated with respect to the housing 6 or from being removed from the housing 6. Therefore, it is possible to prevent a change of the position of the free piston 9 abutting onto the expanding-side cushion 41 and the contracting-side cushion 43. Accordingly, it is possible to stably provide a desired damping characteristic.

Figure 6:
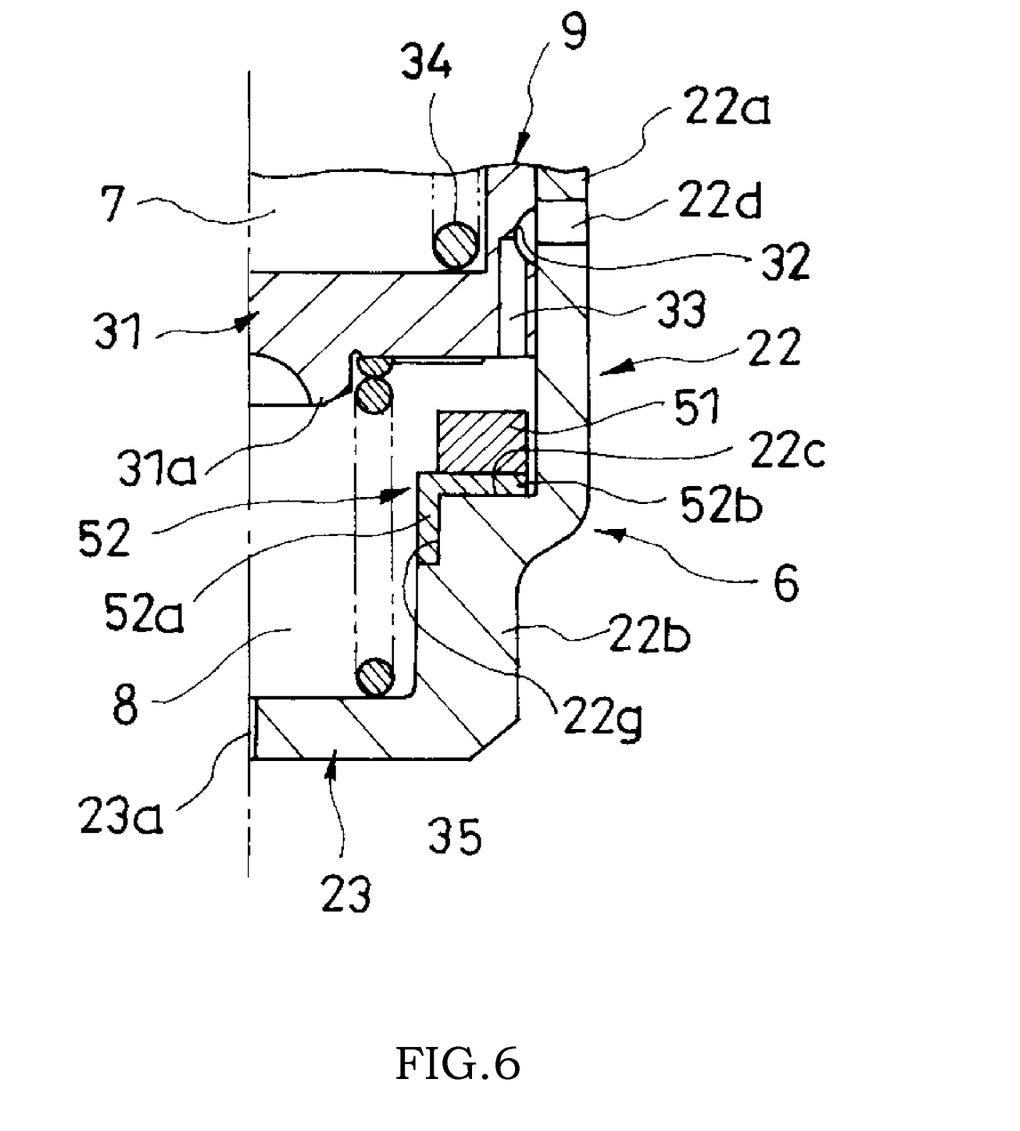
FIG. 6 is a partially enlarged vertical cross-sectional view illustrating a shock absorber according to a third embodiment of this invention.

Next, a description will be made for a shock absorber D3 according to a third embodiment with reference to FIG. 6.

The shock absorber D3 is different from the shock absorber D1 of the first embodiment in a contracting-side cushion 51 and a contracting-side cushion fixing member 52. Other elements are similar to those of the shock absorber D1. Therefore, like reference numerals denote like elements, and descriptions thereof will not be repeated.

The contracting-side cushion fixing member 52 is provided with a tubular press fitting portion 52a forcibly inserted into the small inner-diameter portion 22b of the tubular portion 22 of the housing cylinder 21 and a flange-like fixing portion 52b that protrudes from one end of the press fitting portion 52a, which is the free piston-side end, to the outer circumference side and lies on the step portion 22c. By forcibly inserting the press fitting portion 52a into the fitting recess 22g of the small inner-diameter portion 22b, the contracting-side cushion fixing member 52 is fixed to the housing 6. In addition, the contracting-side cushion 51 has an annular shape and is welded or fused to the fixing portion 52b. The contracting-side cushion 51 is fixed to the housing 6 using the contracting-side cushion fixing member 52. It is noted that the shape of the fixing portion 52b is not limited to the flange shape.

In the shock absorber D3, since the contracting-side cushion 52 is welded or fused to the fixing portion 52b, it is possible to prevent the contracting-side cushion 51 from being removed from the housing 6.

In addition, similar to the shock absorber D1 of the first embodiment, by providing the expanding-side cushion 13 and the contracting-side cushion 52 in the shock absorber D3, it is possible to prevent generation of a clunking sound and prevent a vehicle passenger from feeling discomfort caused by the clunking sound. Therefore, it is possible to improve ride quality of a vehicle.

Furthermore, the shock absorber D3 is provided with the expanding-side cushion fixing member 14 for fixing the expanding-side cushion 13 to the housing 6 and the contracting-side cushion fixing member 52 for fixing the contracting-side cushion 51 to the housing 6. As a result, it is possible to more reliably prevent the expanding-side cushion 13 and the contracting-side cushion 51 from being deviated with respect to the housing 6 or from being removed from the housing 6. Therefore, it is possible to prevent a change of the position of the free piston 9 abutting onto the expanding-side cushion 13 and the contracting-side cushion 52. Accordingly, it is possible to stably provide a desired damping characteristic.

It is noted that, in the first to third embodiments described above, the expanding-side cushion 13 or 41 and the contracting-side cushion 15, 43, or 51 are provided separately in the housing 6. Therefore, a combination of the expanding-side cushion 13 or 41 and the expanding-side cushion fixing member 14 or 42 may have any configuration other than that described above if the expanding-side cushion 13 or 41 can be fixed. Similarly, a combination of the contracting-side cushion 15, 43, or 51 and the contracting-side cushion fixing member 16, 44, or 52 may have any configuration other than that described above if the contracting-side cushion 15, 43, or 51 can be fixed. In addition, the shock absorber may have only the expanding-side cushion or the contracting-side cushion as a cushion.

Embodiments of this invention were described above, but the above embodiments are merely examples of applications of this invention, and the technical scope of this invention is not limited to the specific constitutions of the above embodiments.

With respect to the above description, the contents of application No. 2013-012516, with a filing date of Jan. 25, 2013 in Japan, are incorporated herein by reference.

The invention claimed is:

1. A shock absorber comprising:
   a cylinder;
   a piston slidably inserted into the cylinder, the piston partitioning the cylinder into an expanding-side chamber and a contracting-side chamber;
   a piston rod having one end connected to the piston;
   a damping passage that connects the expanding-side chamber with the contracting-side chamber;
   a housing that forms a pressurizing chamber;
   a free piston slidably inserted into the pressurizing chamber, the free piston partitioning the pressurizing chamber into an expanding-side pressurizing chamber and a contracting-side pressurizing chamber;
   an expanding-side passage that connects the expanding-side chamber with the expanding-side pressurizing chamber;
   a contracting-side passage that connects the contracting-side chamber with the contracting-side pressurizing chamber;
   a spring element configured to position the free piston in a neutral position with respect to the housing, the spring element exerting a biasing force for suppressing displacement of the free piston from the neutral position;
   a cushion configured to collide with the free piston to suppress displacement of the free piston thereover when the free piston is displaced from the neutral position with respect to the housing by a predetermined displacement amount or more; and
   a cushion fixing member fixed to the housing, the cushion fixing member holding the cushion, wherein
   the housing has:
      a nut portion having a brim in an outer circumference, the nut portion fixing the piston to the piston rod, and
      a bottomed cylindrical housing cylinder having a tubular portion hanging down from the brim and a bottom portion closing an end of the tubular portion,
   the tubular portion has:
      a large inner-diameter portion in a nut portion side, the large inner-diameter portion making sliding contact with the free piston,
      a small inner-diameter portion opposite to the nut portion, and
      a step portion formed between the large inner-diameter portion and the small inner-diameter portion,
   the cushion has an annular shape, the cushion being stacked on the step portion, and
   the cushion fixing member has:

a tubular press fitting portion forcibly inserted into the tubular portion, and a fixing portion extending from the press fitting portion, the fixing portion fixing the cushion to the housing.

2. The shock absorber according to claim 1, wherein the press fitting portion is forcibly inserted into the small inner-diameter portion, and the fixing portion is fitted to an inner circumference of the cushion, the fixing portion fixing the cushion to the housing.

3. The shock absorber according to claim 1, wherein the press fitting portion is forcibly inserted into the large inner-diameter portion, and the fixing portion is fitted to the outer circumference of the cushion, the fixing portion fixing the cushion to the housing.

4. The shock absorber according to claim 1, wherein the press fitting portion is forcibly inserted into the small inner-diameter portion, the fixing portion is a flange, the fixing portion protruding from one end of the press fitting portion to an outer circumference side, the fixing portion being stacked on the step portion, and the cushion has an annular shape, the cushion being fixed to the housing through welding or fusing to the fixing portion.

5. A shock absorber comprising:

a cylinder;

a piston slidably inserted into the cylinder, the piston partitioning the cylinder into an expanding-side chamber and a contracting-side chamber;

a piston rod having one end connected to the piston;

a damping passage that connects the expanding-side chamber with the contracting-side chamber;

a housing that forms a pressurizing chamber;

a free piston slidably inserted into the pressurizing chamber, the free piston partitioning the pressurizing chamber into an expanding-side pressurizing chamber and a contracting-side pressurizing chamber;

an expanding-side passage that connects the expanding-side chamber with the expanding-side pressurizing chamber;

a contracting-side passage that connects the contracting-side chamber with the contracting-side pressurizing chamber;

a spring element configured to position the free piston in a neutral position with respect to the housing, the spring element exerting a biasing force for suppressing displacement of the free piston from the neutral position;

a cushion configured to collide with the free piston to suppress displacement of the free piston thereover when the free piston is displaced from the neutral position with respect to the housing by a predetermined displacement amount or more; and a cushion fixing member fixed to the housing, the cushion fixing member holding the cushion, wherein the housing has:

a nut portion having a brim in an outer circumference, the nut portion fixing the piston to the piston rod, and a bottomed cylindrical housing cylinder having a tubular portion hanging down from the brim and a bottom portion closing an end of the tubular portion, the cushion has an annular shape, the cushion being stacked on the brim, and the cushion fixing member has an annular fixing portion gripped by the tubular portion, the annular fixing portion being fitted to the outer circumference of the cushion, the annular fixing portion fixing the cushion to the housing.

6. A shock absorber comprising:

a cylinder;

a piston slidably inserted into the cylinder, the piston partitioning the cylinder into an expanding-side chamber and a contracting-side chamber;

a piston rod having one end connected to the piston;

a damping passage that connects the expanding-side chamber with the contracting-side chamber;

a housing that forms a pressurizing chamber;

a free piston slidably inserted into the pressurizing chamber, the free piston partitioning the pressurizing chamber into an expanding-side pressurizing chamber and a contracting-side pressurizing chamber;

an expanding-side passage that connects the expanding-side chamber with the expanding-side pressurizing chamber;

a contracting-side passage that connects the contracting-side chamber with the contracting-side pressurizing chamber;

a spring element configured to position the free piston in a neutral position with respect to the housing, the spring element exerting a biasing force for suppressing displacement of the free piston from the neutral position;

a cushion configured to collide with the free piston to suppress displacement of the free piston thereover when the free piston is displaced from the neutral position with respect to the housing by a predetermined displacement amount or more; and a cushion fixing member fixed to the housing, the cushion fixing member holding the cushion, wherein the housing has:

a nut portion having a brim in an outer circumference, the nut portion fixing the piston to the piston rod, and a bottomed cylindrical housing cylinder having a tubular portion hanging down from the brim and a bottom portion closing an end of the tubular portion, the spring element has:

an expanding-side spring housed in the expanding-side pressurizing chamber, the expanding-side spring being interposed between the free piston and the brim and a contracting-side spring housed in the contracting-side pressurizing chamber, the contracting-side spring being interposed between the free piston and the bottom portion, the cushion has an annular shape, the cushion being stacked on the brim, and the cushion fixing member has:

an annular seat portion interposed between the brim and the expanding-side spring, and a fixing portion erected from an outer circumference of the seat portion, the fixing portion being fitted to an inner circumference of the cushion, the fixing portion fixing the cushion to the housing.

7. The shock absorber according to claim 5, wherein the tubular portion has:

a large inner-diameter portion in a nut portion side, the large inner-diameter portion making sliding contact with the free piston, a small inner-diameter portion opposite to the nut portion, and a step portion formed between the large inner-diameter portion and the small inner-diameter portion.

8. The shock absorber according to claim 6, wherein the tubular portion has:
- a large inner-diameter portion in a nut portion side, the large inner-diameter portion making sliding contact with the free piston,
- a small inner-diameter portion opposite to the nut portion, and
- a step portion formed between the large inner-diameter portion and the small inner-diameter portion.

9. A shock absorber comprising:
- a cylinder;
- a piston slidably inserted into the cylinder, the piston partitioning the cylinder into an expanding-side chamber and a contracting-side chamber;
- a piston rod having one end connected to the piston;
- a damping passage that connects the expanding-side chamber with the contracting-side chamber;
- a housing that forms a pressurizing chamber;
- a free piston slidably inserted into the pressurizing chamber, the free piston partitioning the pressurizing chamber into an expanding-side pressurizing chamber and a contracting-side pressurizing chamber;
- an expanding-side passage that connects the expanding-side chamber with the expanding-side pressurizing chamber;
- a contracting-side passage that connects the contracting-side chamber with the contracting-side pressurizing chamber;
- a spring element configured to position the free piston in a neutral position with respect to the housing, the spring element exerting a biasing force for suppressing displacement of the free piston from the neutral position;
- a cushion configured to collide with the free piston to suppress displacement of the free piston thereover when the free piston is displaced from the neutral position with respect to the housing by a predetermined displacement amount or more; and
- a cushion fixing member fixed to the housing, the cushion fixing member holding the cushion, wherein the housing has:
- a nut portion having a brim in an outer circumference, the nut portion fixing the piston to the piston rod, and
- a bottomed cylindrical housing cylinder having a tubular portion hanging down from the brim and a bottom portion closing an end of the tubular portion, the tubular portion has:
- a large inner-diameter portion in a nut portion side, the large inner-diameter portion making sliding contact with the free piston,
- a small inner-diameter portion opposite to the nut portion, and
- a step portion formed between the large inner-diameter portion and the small inner-diameter portion, the cushion has an annular shape, the cushion being stacked on the step portion, and the cushion fixing member has:
- a tubular threaded portion screwed to an inner circumference of the small inner-diameter portion, and
- a fixing portion extended from the tubular threaded portion, the fixing portion fixing the cushion to the housing.

* * * * *